United States Patent
Ohnogi

(10) Patent No.: US 6,781,629 B2
(45) Date of Patent: Aug. 24, 2004

(54) DIGITAL CAMERA AND IMAGE REPRODUCING APPARATUS AND METHOD

(75) Inventor: Yasuharu Ohnogi, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/961,170

(22) Filed: Sep. 24, 2001

(65) Prior Publication Data

US 2002/0036702 A1 Mar. 28, 2002

(30) Foreign Application Priority Data

Sep. 26, 2000 (JP) ........................................ 2000-291930

(51) Int. Cl.⁷ .......................... H04N 5/222; H04N 5/76; G09G 5/00
(52) U.S. Cl. .......... 348/333.01; 348/231; 345/FOR 152
(58) Field of Search ....................... 348/333.01, 333.05, 348/333.11, 333.12, 458, 231.8; 345/132, FOR 152

(56) References Cited

U.S. PATENT DOCUMENTS 6,188,431 B1 * 2/2001 Oie ............................ 348/211
6,215,523 B1 * 4/2001 Anderson .............. 348/333.05
6,310,602 B1 * 10/2001 Kasai et al. ................. 345/132

FOREIGN PATENT DOCUMENTS

JP 10-063688 A 3/1998
JP 10-079913 A 3/1998

* cited by examiner

Primary Examiner—Andrew Christensen
Assistant Examiner—Nhan Tran
(74) Attorney, Agent, or Firm—Birch, Stewart, Kolasch & Birch, LLP

(57) ABSTRACT

The digital camera and the image reproducing apparatus and method can reduce a waiting time when a compressed image recorded in a recording medium is reproduced and displayed on a display device, and allows the user to promptly check the reproduced image. Before the user inputs an instruction for sequential or reverse frame feeding, image data is beforehand read out from a recording medium, decompressed, and held in a memory inside the digital camera as prepared images for display. When the instruction for the frame feeding is given, the corresponding prepared image is read out from the memory and then output to the liquid crystal monitor, thereby reducing the reproduction time to achieve fast reproduction. A range of the image which is subjected to a preceding read is a frame image before or after the currently displayed frame, all thumbnail images stored in the recording medium, all main images stored in the recording medium, or all of main images and the thumbnail.

13 Claims, 7 Drawing Sheets

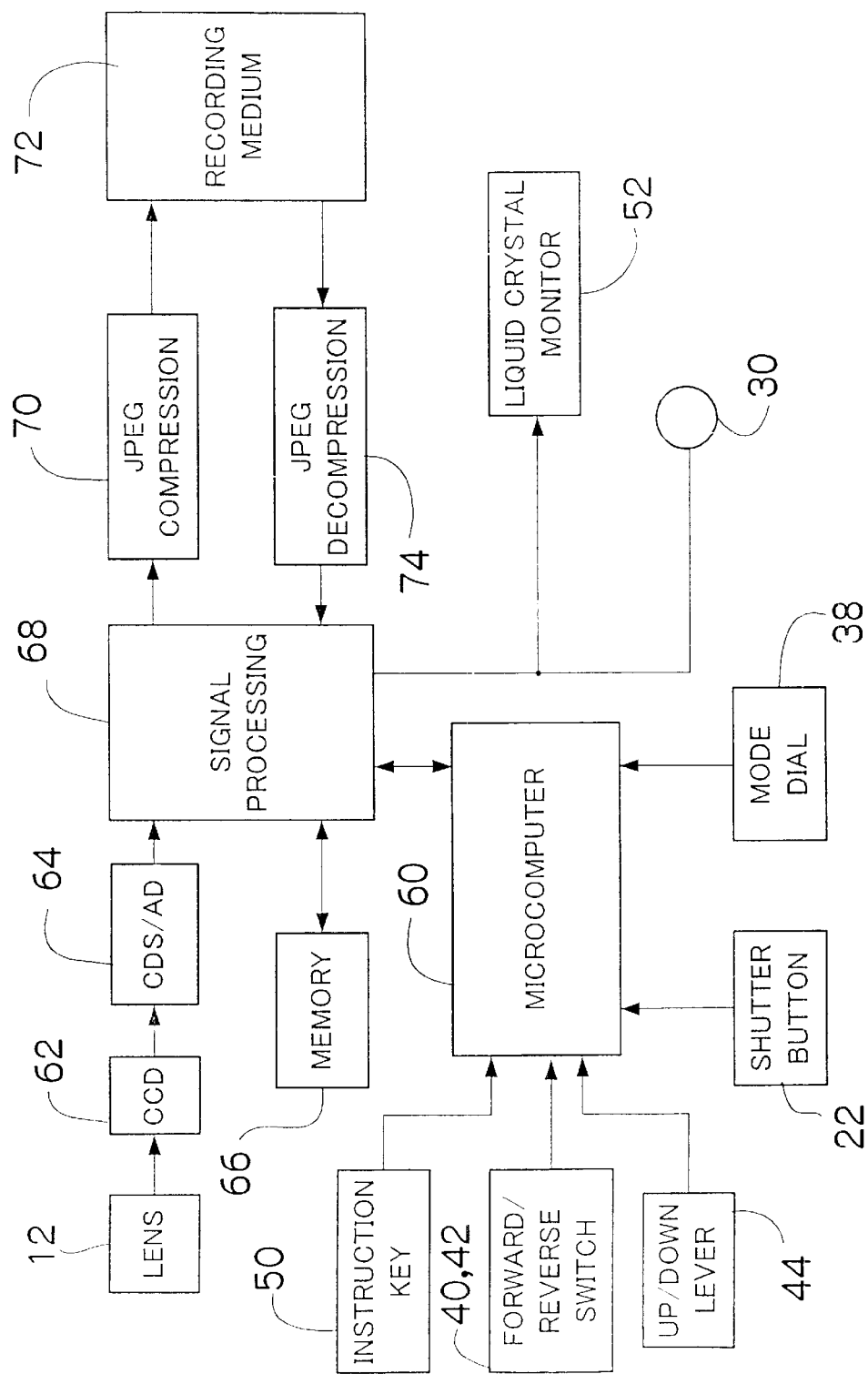
F I G. 3

DIGITAL CAMERA AND IMAGE REPRODUCING APPARATUS AND METHOD

BACKGROUND OF THE INVENTION

1. Field of the Invention

The present invention relates to a digital camera and an image reproducing apparatus having a function of reproducing and displaying images recorded in recording media, as well as a related image reproducing method.

2. Description of the Related Art

General digital cameras compress and record a picked up image in a recording medium. A method is known which is operative at this time, to decimate some data from the picked up image to generate a small-sized non-compressed image (also referred to as a "thumbnail image") and then to record the thumbnail image in a recording medium together with a compressed image (referred to as a "main image"). Further, with digital cameras comprising a liquid crystal display section (LCD) functioning to allow recorded images to be checked or as an electronic view finder, an image recorded in the recording medium can be reproduced and displayed on the liquid crystal display section. Accordingly, the next or preceding image is sequentially displayed in response to a user's operation such as sequential frame feeding or reverse frame feeding.

Recent digital cameras use a large amount of data for recorded images due to an increased number of pixels in a CCD. Thus, a longer time is required to record or reproduce images, so that users may feel uncomfortable about operations. To avoid such an uncomfortable feeling, the digital camera disclosed in Japanese Patent Application Publication No. 10-79913 first displays the thumbnail image, which requires a shorter time for reproduction, and then processes the main image, thereby reducing the time to wait for a decompression process on the main image to be completed. Furthermore, the digital camera disclosed in Japanese Patent Application Publication No. 10-63688 has a function of retrieving a reproduced image at a high speed.

The proposed digital camera, however, cannot reduce the processing time required after an instruction for reproduction and display (instruction for the next or preceding image) has been given and before the main image is displayed.

SUMMARY OF THE INVENTION

The present invention is provided in view of these circumstances, and it is an object thereof to provide a digital camera and an image reproducing apparatus and method which can reduce a waiting time when a compressed image (main image) recorded in a recording medium is reproduced and displayed on a display device, and which allows the user to promptly check the reproduced image.

To attain this object, the present invention is directed to a digital camera, comprising: an image pickup device which converts an optical image into an electric signal; a recording device which records image data obtained via the image pickup device, in a recording medium; a readout device which reads out image data stored in the recording medium; a storage device which stores the image contents read out by the readout device; a display device which displays the image contents stored in the storage device; an instructing device through which an instruction is inputted to change an image as a display target; and a control device which, before the instruction is given by the instructing device, reads out image data other than the current display target from the recording medium to store the data in the storage device as prepared images for display, and which, when the instruction is given by the instructing device, reads out a prepared image corresponding to the instruction, from the storage device and provides the image to the display device to cause the display device to display the image corresponding to the instruction.

The instructing device gives, for example, an instruction for sequential frame feeding or reverse frame feeding. According to the present invention, before a user inputs the instruction for the sequential or reverse frame feeding using the instructing device, the image data is beforehand read out from the recording medium, decompressed, and held in the storage device inside the digital camera as the prepared images for display. This reduces the time required to access the recording medium and execute the decompression process when the user has inputted the instruction for the frame feeding. According to one aspect, as the prepared image, an image before or after the current display target image is stored in the storage device.

According to another aspect of the present invention, the digital camera is characterized in that an image picked up by the image pickup device is recorded in the recording medium in a form of an image file including data on a main image showing the picked up image and data on a thumbnail image obtained by reducing the main image to a specified size; the digital camera further comprises a display mode switching device which switches between a multi-reproduction and display mode for displaying a plurality of frame images at a time in a predetermined arrangement form and a one-frame reproduction and display mode for displaying one frame image; and when the multi-reproduction and display mode is selected, the data on the thumbnail image is read out from the recording medium as the prepared image and then stored in the storage device.

According to still another aspect of the present invention, the digital camera further comprises a size converting device which adjusts an image size depending on a resolution of the display device; and image data having a size thereof adjusted by the size converting device is stored in the storage device as the prepared image. Furthermore, according to yet another aspect of the present invention, the digital camera further comprises a video output terminal for outputting a video signal to an exterior, and has a function of automatically adjust the image size of the prepared image depending on a resolution of an image display device connected to the video output terminal.

The present invention also directed to an image reproducing apparatus, comprising: a readout device which reads out image stored in a recording medium; a storage device which stores the image contents read out by the readout device; a display device which displays the image contents stored in the storage device; an instructing device through which an instruction is inputted to change an image as a display target; and a control device which, before the instruction is given by the instructing device, reads out image data other than the current display target from the recording medium to store the data in the storage device as prepared images for display, and which, when the instruction is given by the instructing device, reads out a prepared image corresponding to the instruction, from the storage device and providing the image to the display device to cause the display device to display the image corresponding to the instruction.

According to the present invention, there is provided an image reproducing method of reading out image data stored in a recording medium and displaying an image on a display device, the method being characterized by comprising reading out image data other than a current display target to store the data in a storage device for display as prepared images for display, before an instruction to change an image as a display target is inputted, and reading out a prepared image corresponding to the instruction, from the storage device and providing the image to the display device to cause the display device to display the image corresponding to the instruction, when the instruction to change the image is inputted.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3 is a block diagram showing an internal configuration of the digital camera of this example;

DETAILED DESCRIPTION OF THE PREFERRED EMBODIMENTS

A preferred embodiment of a digital camera and an image reproducing apparatus and method will be described below with reference to the attached drawings.

Figure 1:
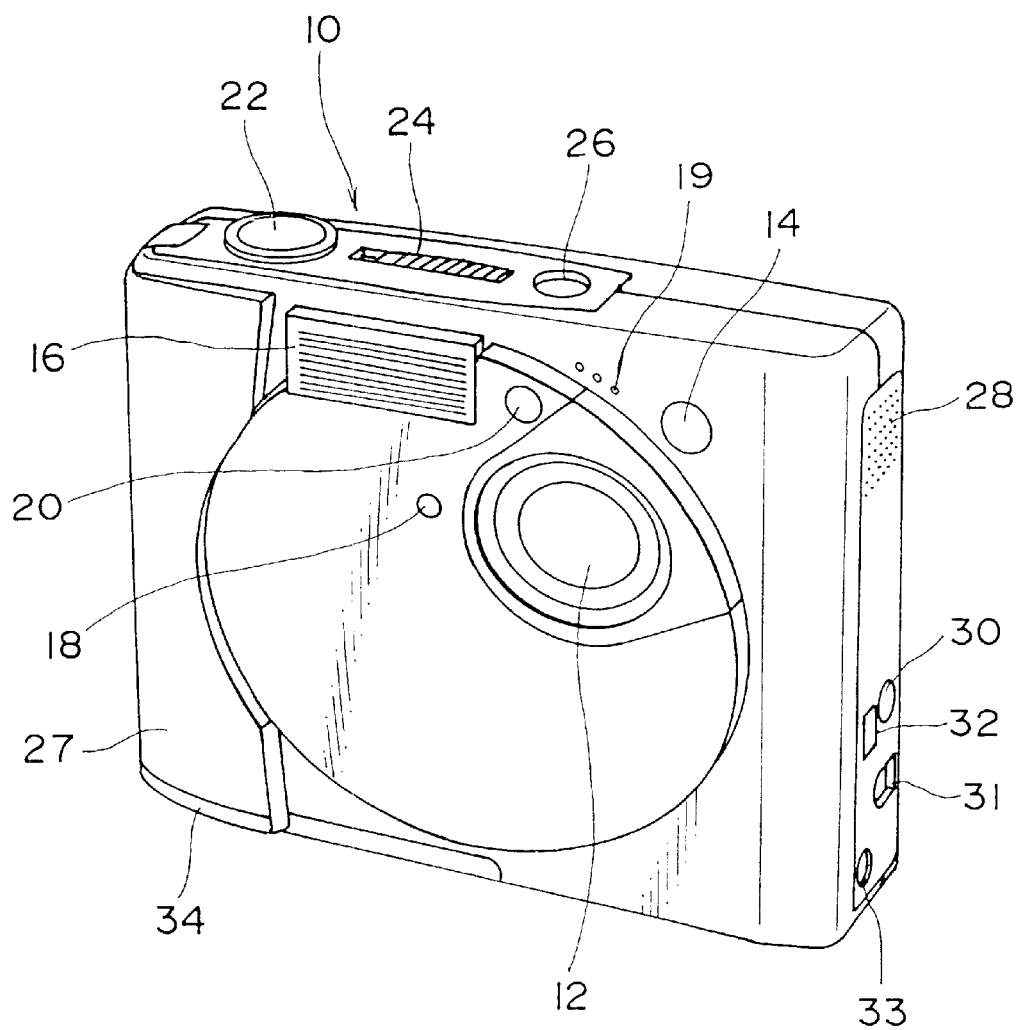
FIG. 1 is a perspective view of a digital camera according to an embodiment of the present invention.

FIG. 1 is a perspective view of a digital camera according to the embodiment of the present invention. A digital camera 10 comprises a photographing lens 12, a finder window 14, a stroboscope 16, a stroboscopic dimming sensor 18, a microphone 19, and a self-timer lamp 20 arranged on a front surface thereof. The camera has a shutter button 22, a power switch 24, and a stroboscope button 26 disposed on a top surface thereof, the stroboscope button 26 switching a stroboscopic photographing mode. The camera also has a speaker 28, an audio/video output terminal 30, a remote control terminal 31, a digital (USB) terminal 32, and a power input terminal 33 arranged on a side surface thereof opposite to a grip section 27. Further, the camera has a battery cover 34 arranged on a bottom cover thereof and also acting as a slot cover for a memory card (not shown in FIG. 1 and corresponding to reference number 72 in FIG. 6). A card slot and a battery housing chamber, neither of which is shown, are formed behind the battery cover 34.

Figure 2:
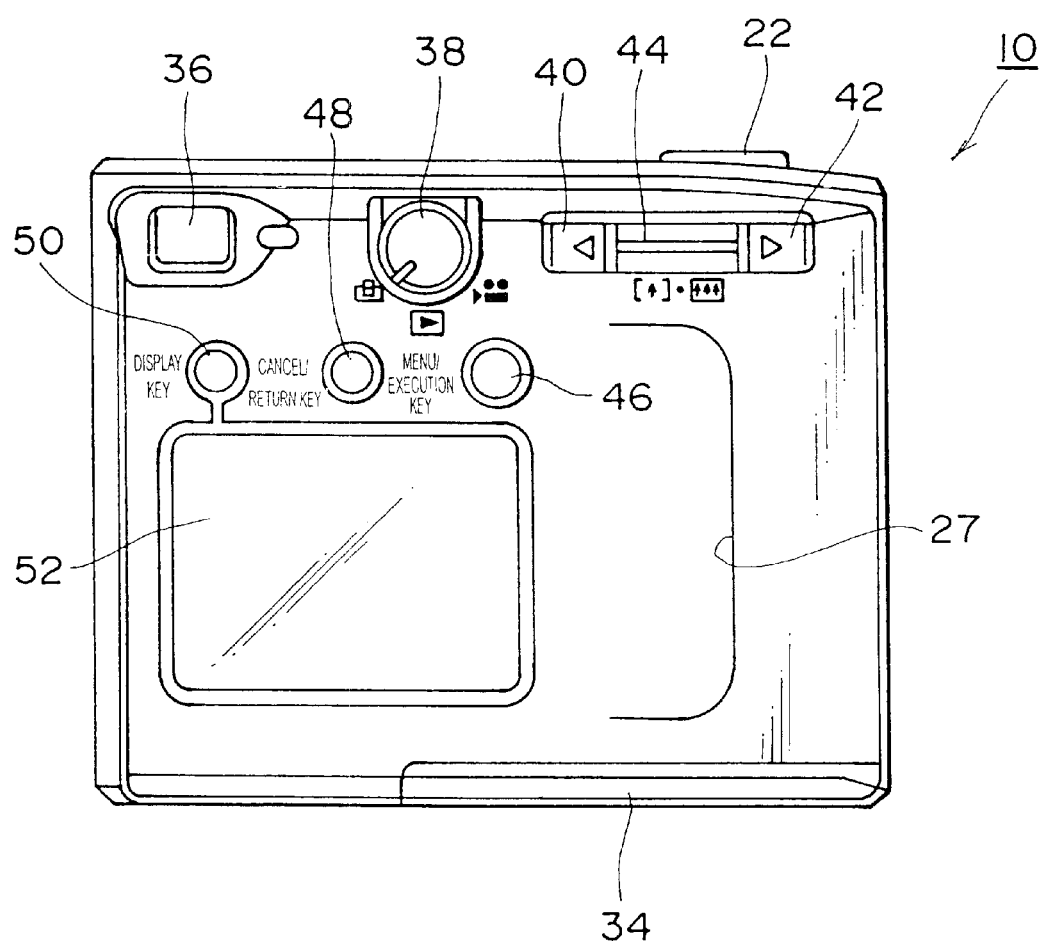
FIG. 2 is a rear view of the digital camera shown in FIG. 1.

FIG. 2 is a rear view of the digital camera 10. The camera has a finder 36, a mode dial 38, a left key 40, a right key 42, an up/down lever 44, a menu/execute key 46, a cancel/return key 48, a display key 50, a liquid crystal monitor 52, and others arranged on a rear side thereof. The mode dial 38 is used to change the function (mode) of the camera. Rotationally moving the mode dial 38 enables the setting of either a photographing mode for still photographing or a reproduction mode for reproducing picked up images or a movie mode for animated image photographing.

The left key 40, the right key 42, and the up/down lever 44 constitute an operation section for inputting instructions for corresponding four directions (left, right, up, and down). The left key 40 and the right key 42 function as a one-frame reverse-feeding button and a one-frame sequential-feeding button during the reproduction mode. The up/down lever 44 is used as a scaling zoom lever for a reproduction zoom function or an electronic zoom function for photographing.

Further, the left key 40, the right key 42, and the up/down lever 44 function as operation buttons for instructing a cursor to be moved on a multi-reproduction screen. If the menu mode has been set using the menu/execution key 46, these keys and lever function as operation buttons for selecting a menu from a list of menus or instructing one of the set items in each menu to be selected.

The menu/execution key 46 is used to shift from a normal screen to a menu screen in each mode, to enter a selected content, or to instruct a process to be executed confirmed. The cancel/return key 48 is used to cancel the item selected from the menu or to return to the preceding operational state. The display key 50 is an operation device with which the user turns on and off the liquid crystal monitor 52 and/or switches the reproduction method and the display/non display of the number of a frame being reproduced or the like.

In the photographing mode or the movie mode, depressing the display key 50 enables the liquid crystal monitor 52 to be turned on and off. Further, in the reproduction mode, each time the display key 50 is depressed, the mode starts with "one-frame reproduction (on screen display present)" and then cycles from "on screen display absent" through "multi-reproduction" to "one-frame reproduction (on screen display present)". The "multi-reproduction" mode is a reproduction method of displaying a plurality of screens at a time. In this example of multi-reproduction, nine screens are displayed in three rows and three columns.

The liquid crystal monitor 52 can be used as an electronic finder for checking the angle of view during photographing, and can display a preview picture of a photographed image, a reproduced image read out from a recording medium 72 installed in the camera, or the like. Further, the selection of a menu using the left key 40, the right key 42, and the up/down lever 44 or the setting of one of the set items in each menu is carried out using a display screen of the liquid crystal menu 52. The liquid crystal monitor 52 also displays information such as the number of frames that can be photographed (for animated images, the time for which photographing is available), the display of the number of a reproduced frame, the presence of stroboscopic light emission, the display of the use of a macro mode, the display of recorded image quality, the number of pixels, or the like.

FIG. 3 is a block diagram showing the internal construction of the digital camera 10. When the mode dial 38 is used to set the photographing mode and the shutter button 22 is then depressed, a microcomputer 60 detects this and controls the execution of the still photographing operation. That is, the microcomputer 60 executes auto focus (AF) control and auto exposure (AE) control so as to form an image of a subject light on a light receiving surface of a charge coupled device (CCD) 62 via the photographing lens 12. The CCD 62 converts the subject light formed on the light receiving surface as an image into signal charges the amount of which corresponds to the quantity of the subject light.

The thus accumulated signal charges are sequentially read out as voltage signals corresponding to these signal charges. The voltage signals sequentially read out from the CCD 62 are added to a correlation double sampling (CDS) circuit 64, where R, G, and B signals are sampled and held for each pixel and then amplified. The signals are then converted into digital ones by an A/D converter. These digital signals are temporarily saved to a memory 66 and then added to a signal processing circuit 68.

The signal processing circuit 68 executes a synchronization process of converting the input point-sequential R, G, and B signals into a simultaneous equation, a white balance adjustment process, a gamma correction process, a YC signal process, or the like. Luminance signals Y and chromatic signals Cr and Cb (YC signals) created by the YC signal process of the signal processing circuit 68 are saved to the memory 66 again, then sequentially compressed by an JPEG compression circuit 70, and finally recorded in the recording medium 72.

In the digital camera 10 of this example, still image data is stored in the recording medium 72 as an image file according to the Exif standard. An Exif file has an area in which data on main images is stored and an area in which data on reduced images (thumbnail images) is stored. The data on a main image obtained through photographing is subjected to a pixel decimation process and other required data processing to generate a thumbnail image of a specified size (for example, 160×120 or 80×60 pixels, or the like). The thus generated thumbnail image is written to the Exif file together with the main image. In recording the data in the file, the microcomputer 60 automatically applies a non-duplicate file number (frame number) to each image file and also adds recorded date and time and other file managing information thereto.

The recording medium 72 for saving an image file thereto comprises, for example, a smart medium (Solid-State Floppy Disk Card). The recording medium 72 may also be in the form of a PC card, a compact flash, a magnetic disk, an optical disk, a magneto-optical disk, a memory stick, or the like. Various media can be used to and from which data can be written and read in accordance with an electronic, magnetic, or optical method or a combination thereof. A signal processing device and an interface which are compatible with the medium used are applicable. The camera may be configured so that a plurality of recording media can be installed in the main body whether the media are of the same type or different types. Further, the means for saving image files is not limited to a removable medium that can be installed in and removed from the camera main body but may be a recording medium (internal memory) built into the camera.

When the movie mode is set using the mode dial 38, animated image recording is enabled, and the shutter button 22 is also used as a recording button (recording start/stop button). Depressing the shutter button 22 starts a recording operation, and depressing it again stops the recording operation. The recording operation may be performed while the shutter button 22 remains depressed, and may be stopped when the depressing is cleared. A maximum time for which data can be recorded within a single photographing session, an image size, a frame rate, and a recording method are predetermined. For example, an audible movie can be photographed for about 80 seconds at maximum within a single photographing session, and is recorded in the recording medium 72 at 10 frames/sec. in the Motion JPEG form as 320×240 pixels.

When the reproduction mode is set by using the mode dial 38, an image file for a final frame recorded in the recording medium 72 is read out. The compressed data in the read-out image file is decompressed into a YC signal by a JPEG decompression circuit 74 and expanded and saved to the memory 66. The image signal expanded in the memory 66 has its size adjusted to a displayed image size via the signal processing circuit 68, is converted into a color composite video signal based on the NTSC method, and output to the liquid crystal monitor 52 and to the audio/video output terminal 30. Thus, the frame image of the final image recorded in the recording medium 72 is displayed on the liquid crystal monitor 52. Further, if an image display apparatus such as a television receiver (not shown) or the like is connected to the audio/video output terminal 30, the image of the final frame is displayed on the television receiver or the like.

Subsequently, depressing the left key 40 causes a frame to be fed in the opposite direction, and depressing the right key 42 causes a frame to be fed in the forward direction. A preceding or next frame instructed through the key operation to be fed is reproduced and displayed on the liquid crystal monitor 52. When the forward frame feeding instruction is given while the final frame is being displayed, the first frame (leading frame) is displayed. When the reverse frame feeding instruction is given while the first frame (leading frame) is being displayed, the final frame is displayed.

If the file to be reproduced is an animated image file, the leading frame (first frame) of the animated image is displayed as a representative image. The on screen display of this screen allows the acceptance of an instruction to start reproducing the animated image.

Figure 4:
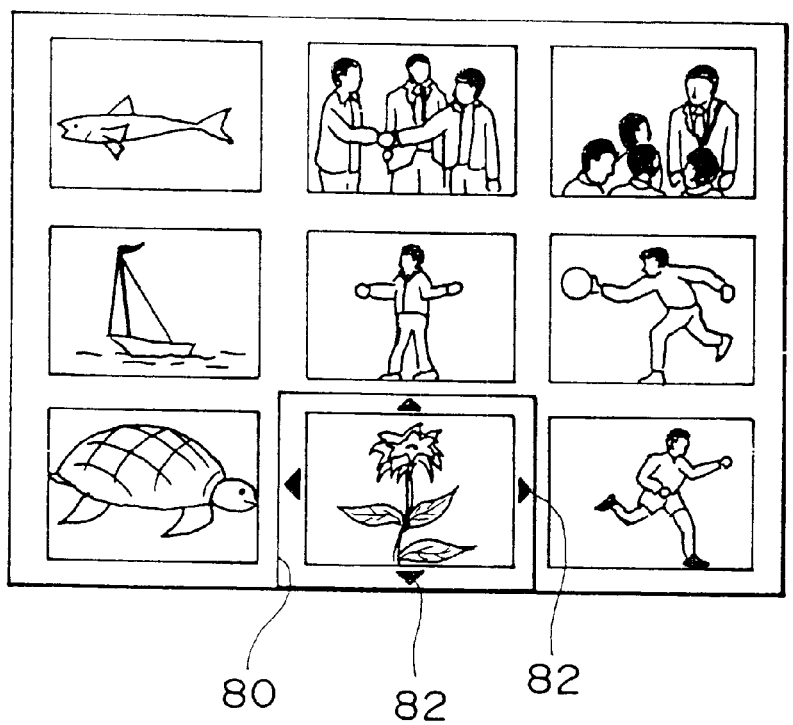
FIGS. 4(A) and 4(B) are views showing examples of a display of a multi-reproduction screen.
Figure 4:
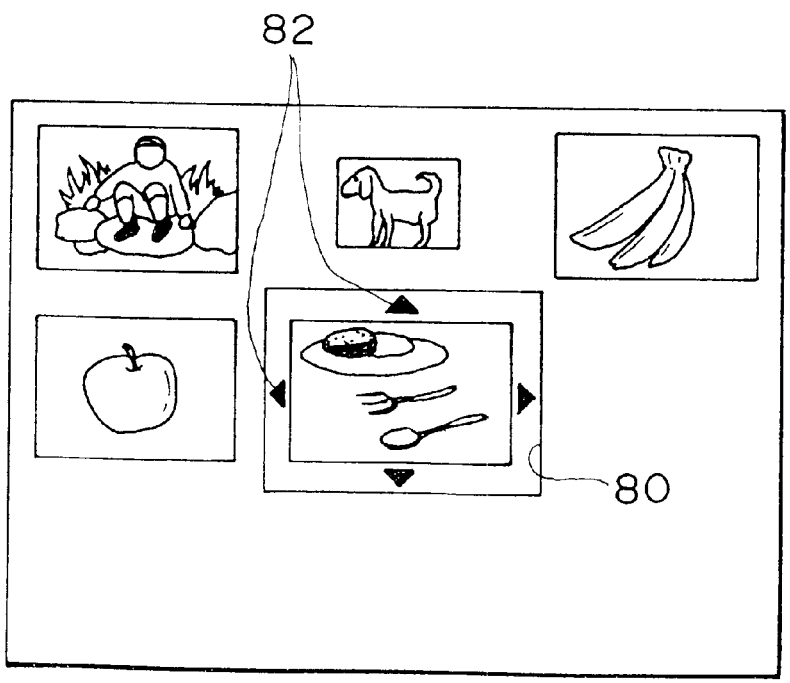

When the display key 50 is depressed twice while a normal screen (on screen display present) for one-frame reproduction is being displayed, the camera is switched to the multi-reproduction mode. FIGS. 4(A) and 4(B) show an example of display for multi-reproduction. The multi-reproduction is a display form in which all the image files in the recording medium 72 are partitioned into sets of nine frames in the order of photographing starting with the leading frame and in which the image contents of the nine frames are displayed in the corresponding screens at a time. The images of the nine frames constitute a multi-reproduction image for one page, and the display screen is switched on a page-by-page basis.

When the total number of image files stored in the recording medium is not a multiple of nine, the final page contains less than nine screens. For example, if the total number of image files (frames) is 24, the multi-reproduction screen containing the final frame is as shown in FIG. 4(B), and nothing is displayed in display areas containing no frames to be displayed (black screen). The image in the center of the top stage of FIG. 4(B) is the representative image of the animated image file and is shown to be smaller than the still images so as to discriminate itself from still image files.

When the one-frame reproduction mode is switched to the multi-reproduction mode, a nine-screen multi-reproduction image is displayed which containing the image (selected image) that was displayed during the one-frame reproduction, with the selected frame enclosed by a frame line 80. FIG. 4(A) shows that the frame in the center of the bottom stage is selected, and FIG. 4(B) shows that the frame (final image) in the center of the middle stage is selected. The frame line 80 hereinafter referred to as "cursor" corresponds to a cursor specifying a selected target, and can be moved rightward, leftward, upward, and downward by operating the left key 40, the right key 42, or the up/down lever 44.

The left key 40 can be used to give an instruction for one-frame reverse feeding, the right key 42 can be used to give an instruction for one-frame forward feeding, the up/down lever 44 can be operated upward (this operation will be hereinafter referred to as "depression of an up key") to give an instruction for three-frame reverse feeding, and the up/down lever 44 can be operated downward (this operation will be hereinafter referred to as "depression of a down key") to give an instruction for three-frame forward feeding. Near the cursor 80, a triangular mark 82 indicating that an instruction for movement using the left key 40, the right key 42, or the up/down key 44 is accepted.

When the down key is depressed while the cursor is at the position shown in FIG. 4(A), the nine-screen multi-reproduction image for the next page is displayed. At this time, the cursor 80 may be moved to the position of the three-frame forward feeding in accordance with the above described rule or to the leading image (at the leftmost position of the top stage) in that page. Furthermore, in contrast with this, when the up key is depressed while the cursor is positioned on the image at the leftmost position, the nine-screen multi-reproduction image for the last page is displayed. At this time, the cursor 80 may be moved to the position of the three-frame backward feeding in accordance with the above described rule or to the last image (at the rightmost position of the bottom stage) in that page.

Thus, frame images beyond which the page of the nine-screen multi-reproduction image is switched are called "page boundary frames". In FIG. 4(B), the three images in the top or bottom stage are the page boundary frames. A leading page and a final page are contiguous to each other in a cyclic manner so that when the instruction for the forward frame feeding is inputted from the final page, the nine-screen multi-reproduction screen for the leading page appears. In FIG. 4(B), the images in the middle stage are also the page boundary frames. In contrast, when the instruction for the reverse frame feeding is inputted from the page boundary frames in the top stage of the final page, the multi-reproduction screen for the final page appears.

Now, the image size will be described in brief. For the digital camera 10, the number of pixels used to record a still image can be selected from three types including "2400×1800", "1280×960", and "640×480". Further, a compression rate (quality) can be selected from "Fine", "Normal", and "Basic" so as to correspond to the selected number of pixels. As already described, the Exif file has not only the main image but also the thumbnail image. The thumbnail image has a specified size (in this example, 160×120) regardless of the image size of the main image. Furthermore, the liquid crystal monitor 52 has a resolution of "320×240", and a television receiver connected to the audio/video output terminal 30 has a most common resolution of "640×480". To display an image on the liquid crystal monitor 52 or the television receiver, processing for properly adjusting the image size is required.

Figure 5:
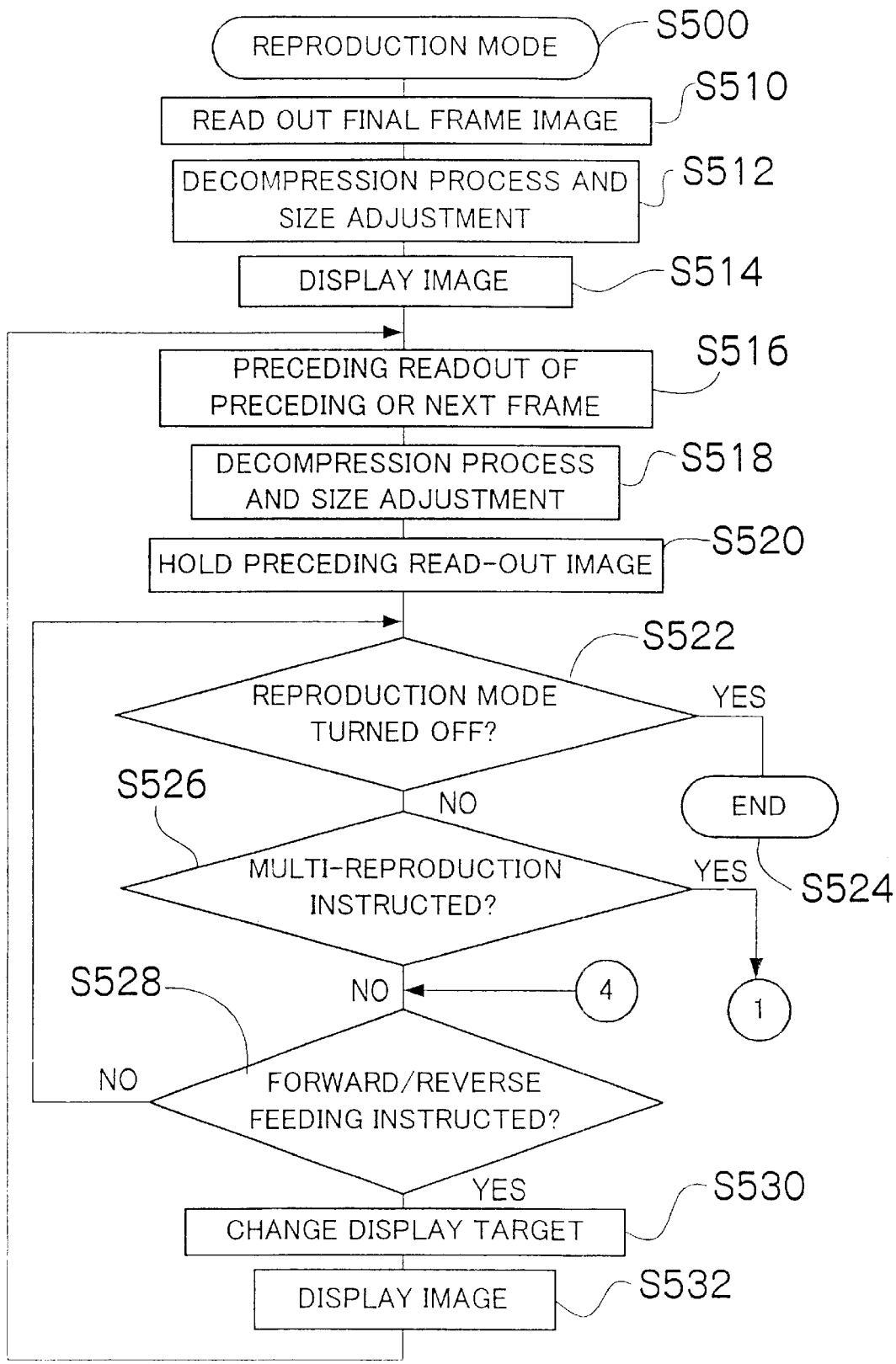
FIG. 5 is a flow chart showing a control procedure for a reproduction mode.
Figure 6:
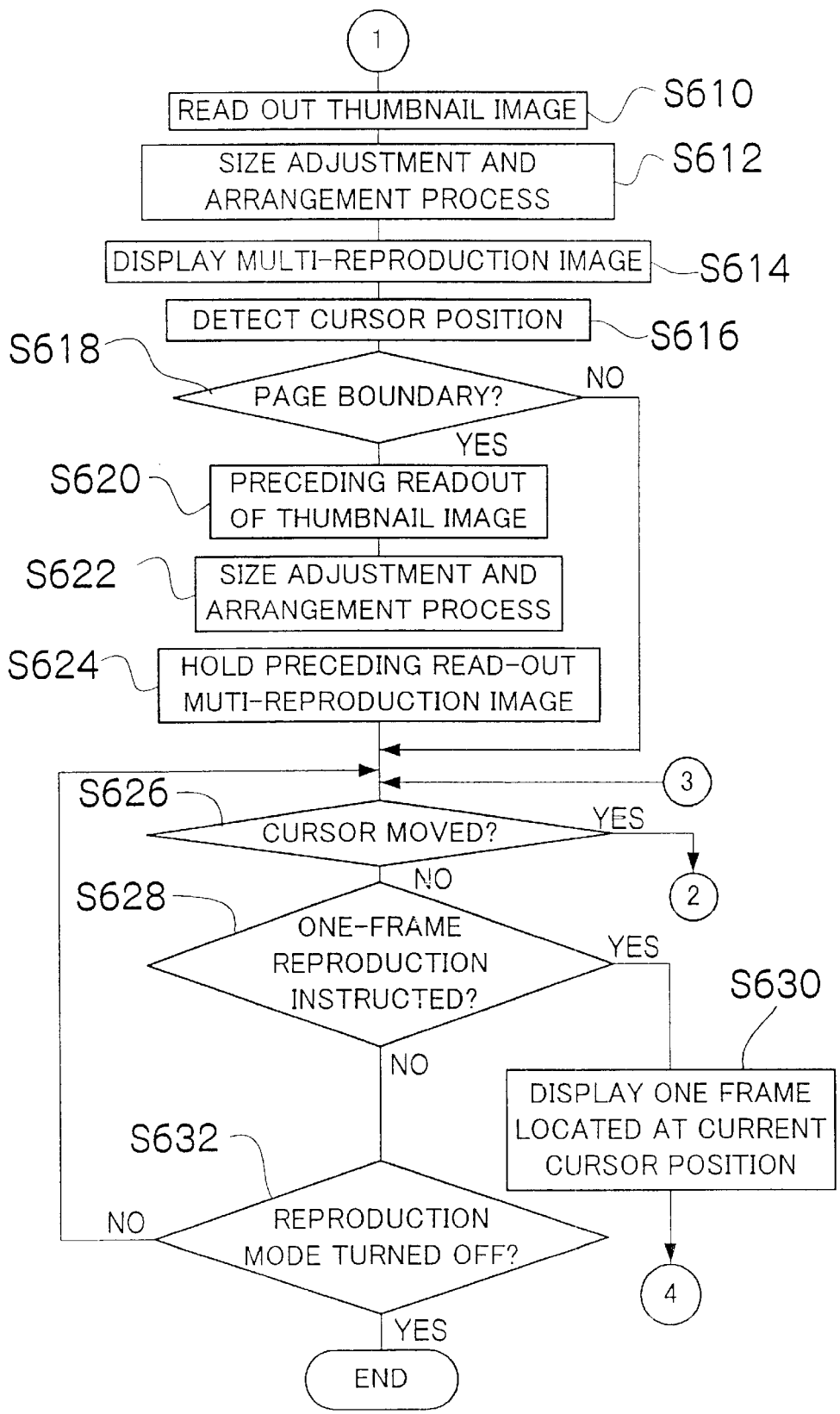
FIG. 6 is a flow chart showing the control procedure for the reproduction mode.
Figure 7:
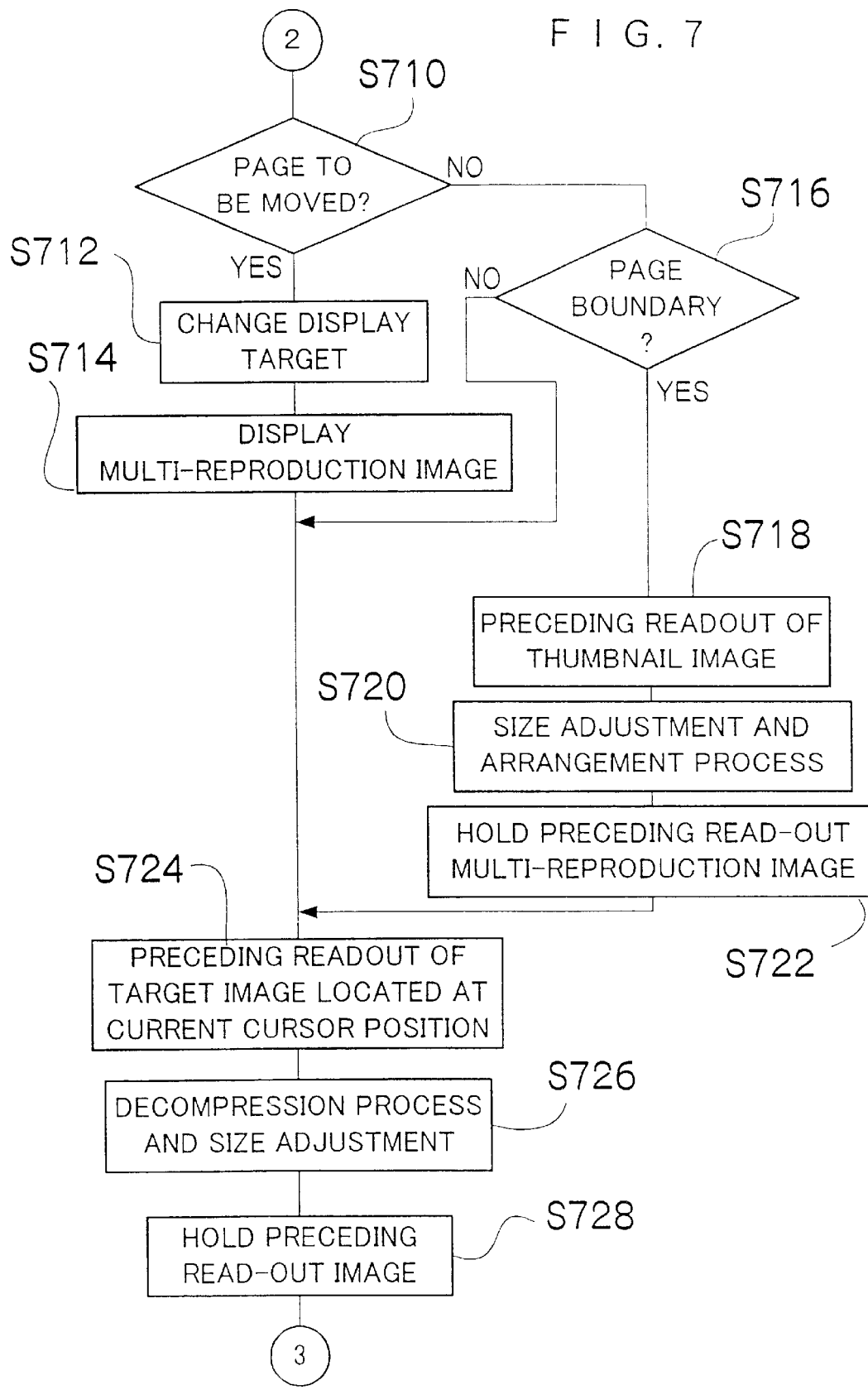
FIG. 7 is a flow chart showing the control procedure for the reproduction mode.

Next, a reproduction function of the digital camera 10 constructed as described above will be described. FIGS. 5 to 7 are flow charts showing a control procedure for the reproduction mode. When the reproduction mode is selected to start a process in the reproduction mode (step S500), the microcomputer 60 accesses the recording medium 72 to read out the main image data from the image file of the final frame (step S510). The read-out compressed data is decompressed and adjusted to an image size suitable for display (step S512). Thus, one frame of the final frame image is displayed on the liquid crystal monitor 52 (step S514).

Then, even if the user does not give the instruction for the forward or reverse frame feeding, the microcomputer 60 beforehand reads out the image file of the frame before or after the currently displayed one beforehand (the leading frame is read out instead of the next frame while the final frame is being displayed, and the final frame is read out instead of the preceding frame while the leading frame is being displayed) from the recording medium 72 (step S516). The compressed data on the read-out preceding or next frame is decompressed and adjusted to the image size suitable for display (step S518). The adjusted data is then stored in the memory 66 (step S520).

Subsequently, the microcomputer 60 determines whether or not the reproduction mode has been turned off (step S522). When the mode dial 38 is rotated to switch to the photographing or movie mode, the reproduction mode is turned off (the result of the determination is affirmative) to end the control of the reproduction mode (step S524). On the other hand, when the reproduction mode is maintained at step S522 (the result of the determination is negative), the process proceeds to step S526 to determine whether or not the instruction for the multi-reproduction has been given.

When the instruction to switch to the multi-reproduction and display mode has not been given (the result of the determination is negative), the process proceeds to step S528. At this step, it is determined whether or not the instruction for the forward or reverse feeding has been given. When the instruction for the forward or reverse frame feeding has not been given (the result of the determination is negative), the process returns to step S522.

On the other hand, at step S528, when the user operates the left key 40 or the right key 42 to give the instruction for the frame feeding, the result of the determination is affirmative. In this case, the frames are fed in the forward or reverse direction in accordance with the given instruction to change the image to be displayed (step S530). Since the image to be displayed is held in the memory 66 at step S520, the image of the next frame (or the preceding frame) is displayed immediately after the instruction for the frame feeding has been give (step S532). Subsequently, the process returns to step S516 to beforehand read out the frame before or after the currently displayed one as a reference.

For example, while the final frame (N-th frame) is being displayed, the preceding frame ((N–1)-th frame) and the leading frame (first frame) have already been expanded and held in the memory 66 by preceding reading. In this state, when the instruction for the reverse frame feeding is given, the data on the (N–1)-th frame is read out from the memory 66 and reproduced and displayed on the liquid crystal monitor 52. When the (N–1)-th frame is reproduced and displayed, beforehand read data (in this case, the first frame) that is not contiguous to the frame being displayed is omitted from the memory 66, and instead the data on the preceding frame ((N–2)-th frame) is beforehand read out from the recording medium 72 and then expanded and held in the memory 66. Further, the presently displaying frame, which is next to the currently displayed one ((N–1)-th frame), has already been saved to the memory 66, and thus need not be read out from the recording medium 72.

In this manner, the preceding reads are executed so that one frame image being displayed and the frame images before and after it are held in the memory 66. Then, in response to the instruction for the frame feeding, the image to be displayed is instantaneously displayed, and the contents held in the memory 66 are updated.

At step S526, when the instruction to switch to the multi-reproduction and display mode is given (the result of the determination is affirmative), that is, if the display key 50 is depressed twice during the one-frame display (on screen display present) or the display key 50 is depressed once during the one-frame display (on screen display absent), the process jumps to step S610, shown in FIG. 6.

At step S610, thumbnail data is read out from each file in the recording medium 72. In this case, thumbnail data is read out which is required to display the nine-screen multi-reproduction image containing the frame displaying one frame when the instruction for the multi-reproduction was given. For animated image files, the data on the leading frame, which is a representative image, is read out. As in still image files, the thumbnail image of the leading frame may be stored in the animated image file or recorded in a separate file as an image for display.

The thumbnail data read out at step S610 has its size adjusted and is then arranged in a predetermined form (in this example, a square arrangement of 3×3 frames) (step S612). The data is then displayed on the liquid crystal monitor 52 as a nine-screen multi-reproduction image (step S614). Then, the current cursor position is detected (step S616), and it is determined whether or not the selected frame is at a page boundary of the multi-reproduction image (step S618). If the page boundary frame has been selected (the result of the determination is affirmative), a thumbnail image is beforehand read out which is required to display the multi-reproduction image for the adjacent page (step S620). The image has its size adjusted and is properly arranged (step S622), and the resulting data on the multi-reproduction image is held in the memory 66 (step S624).

Subsequently, the process proceeds to step S626 to determine whether or nor the instruction to move the cursor has been given. If the result of determination at step S618 is negative, the process proceeds to step S626 by omitting steps S620 to S624.

When it is determined at step S626 that the instruction to move the cursor has been given (the result of the determination is affirmative), the process proceeds to step S710, shown in FIG. 7. At this step S710, it is determined whether or not the given instruction to move the cursor requires the page for the multi-reproduction image to be moved. If the page must be moved (the result of the determination is affirmative), the process proceeds to step S712 to change the multi-reproduction image to be displayed. Since the newly displayed multi-reproduction image is held in the memory 66 at step S624 described in FIG. 6, the multi-reproduction image for the next page (or the preceding page) is displayed immediately after the instruction to move the cursor has been given (step S714).

At step S710, if the page of the multi-reproduction image need not be moved (the result of the determination is negative), the process branches to step S716 to determine whether or not the cursor is located at the page boundary after the movement. If the selected frame is at the page boundary (the result of the determination is affirmative), a thumbnail image is beforehand read out which is required to display the multi-reproduction image for the adjacent page (step S718). The image has its size adjusted and is properly arranged (step S720), and the resulting data on the multi-reproduction image is held in the memory 66 (step S722).

Subsequently, the process proceeds to step S724. Further, when the frame at the page boundary has not been selected at step S716 the result of the determination is negative or after step S714 has been completed, the process proceeds to step S724. At this step S724, the data on the main image, that is, the target image shown by the current cursor position, is beforehand read out from the recording medium 72. The compressed data on the preceding read-out target image is decompressed and adjusted to the image size suitable for display (step S726). The adjusted data is then held in the memory 66 to allow for the input of the instruction for the one-frame display (step S728). After step S728, the process shifts to step S626, shown in FIG. 6.

If it is determined at step S626 that the instruction to move the cursor has not been given (the result of the determination is negative), the process proceeds to step S628. At this step, it is determined whether or not the instruction to switch to the one-frame reproduction and display mode has been given. When the display key 50 is depressed once while the multi-reproduction image is being displayed, the result of the determination at step S628 is affirmative, and the process branches to step S630. At step S630, one frame image of the target frame image shown by the current cursor position is displayed. Since the data on the displayed image is held in the memory 66 at step S728, described in FIG. 7, or at step S514 or S532 in FIG. 5 if the mode has been returned to the one-frame reproduction without changing the selected image on the multi-reproduction screen, the corresponding frame can be instantaneously reproduced after the instruction to switch to the one-frame reproduction mode has been inputted.

After the one-frame reproduction process shown at step S630 in FIG. 6, the process shifts to step S528, shown in FIG. 5. On the other hand, if it is determined at step S628 in FIG. 6 that instruction to switch to the one-frame reproduction and display mode has not been given (the result of the determination is negative), it is determined whether or not the reproduction mode has been turned off (step S632). If it is determined at step S632 that the reproduction mode is maintained (the result of the determination is negative), the process returns to step S626 to repeat the above described process. On the other hand, if it is determined at step S632 that the mode dial 38 has been rotated to switch to the photographing or movie mode, reproduction mode is turned off (the result of the determination is affirmative), the control of the reproduction mode is ended (step S640).

According to the digital camera 10 according to this embodiment, before the user inputs the instruction for the frame feeding, the image data is read out from the recording medium 72, subjected to the decompression process or the like, and held in the memory 66 in order to allow for the input of this instruction. This reduces the time required after the user has actually given the instruction for the frame feeding or the like and before the target image is displayed.

As a variation of the above described embodiment, the range subjected to the leading read can be changed. For example, all the thumbnail images stored in the recording medium 72 may be beforehand read and held in the memory 66. Further, when the memory 66 has a sufficiently large storage capacity, all the main images or all the main and thumbnail images may be beforehand read, expanded, and held in the memory 66.

Furthermore, during the preceding read, the image size may be automatically adjusted depending on the resolution of the image display apparatus connected to the camera via the audio/video output terminal 30 so that data of the image size suitable for the resolution of the output destination can be saved to the memory 66. A device which automatically recognizes the type of the image display apparatus of the output destination, may be added, or the type or resolution may be inputted using a predetermined operation device such as a key input.

In the above described embodiment, the digital camera has been illustrated, but an image reproducing apparatus having no image pickup function can also reduce the reproduction time by including a reproduction function similar to that described above.

As described above, according to the present invention, before the user inputs the instruction for the sequential or reverse frame feeding using the instructing device, the image data is beforehand read out from the recording medium, decompressed, and held in the storage device inside the camera as the prepared images for display. This reduces the time required to access the recording medium and execute the decompression process when the user has inputted the instruction for the frame feeding. This in turn reduces the waiting time for the reproduction and display, thereby enabling the user to promptly check the reproduced image.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A digital camera, comprising:

an image pickup device which converts an optical image into an electric signal;

a recording device which records image data obtained via the image pickup device in a recording medium as a main image and a thumbnail image, wherein the main image data of the optical image is recorded with a predetermined number of pixels as compressed data in the recording medium, said predetermined number of pixels being determined during a photographing of said optical image;

a readout device which reads out image data stored in the recording medium;

a storage device which stores the image contents read out by the readout device;

a display device which displays the image contents stored in the storage device;

an instructing device through which an instruction is inputted to change an image as a current display target;

a control device which reads out additional image data other than the current display target from the recording medium to store the additional data in the storage device as prepared main images for display before the instruction is given by the instructing device to display the additional data as prepared main images, and immediately reads out a prepared main image corresponding to the instruction from the storage device when the instruction is given by the instructing device and provides the prepared main image to the display device to cause the display device to display the image corresponding to the instruction; and a size converting device, said size converting device adjusting an image size of the prepared main image corresponding to the instruction depending on a resolution of the display device; wherein image data having the image size thereof adjusted by the size converting device is stored in the storage device as the prepared main image and the compressed image data of the optical image is decompressed and adjusted to the image size of the prepared main image.

2. The digital camera according to claim 1, wherein main images located a frame before and a frame after the current display target main image are stored as prepared main images.

3. The digital camera according to claim 1, wherein:

an image picked up by the image pickup device is recorded in the recording medium in a form of an image file including data on a the main image showing the picked up image and data on a the thumbnail image obtained by reducing the main image to a specified size;

the digital camera further comprises a display mode switching device which switches between a multi-reproduction and display mode for displaying a plurality of frame images at a time in a predetermined arrangement form and a one-frame reproduction and display mode for displaying one frame image; and when the multi-reproduction and display mode is selected, the data on the thumbnail image is read out from the recording medium as the prepared image and then stored in the storage device.

4. The digital camera according to claim 1, wherein the digital camera further comprises a video output terminal for outputting a video signal to an exterior, and has a function of automatically adjusting the image size of the prepared main image depending on a resolution of an image display device connected to the video output terminal.

5. The digital camera according to claim 1, wherein an image contained in a file to be reproduced in a reproduction mode is displayed in a single frame and a file of a frame other than the current display target image is read out from the recording medium as the prepared main image when displaying the current display target image, and the compressed image data of the file of the frame other than the current display target image is decompressed and adjusted to an image size suitable for display of the prepared main image and stored in the storage device.

6. The digital camera according to claim 1, wherein a cursor for selecting an image to be displayed is displayed on a display screen for a multiple reproduction image and is moved by an operator of the digital camera to a cursor position, and the compressed image data of a target image corresponding to the cursor position is read out from the recording medium, decompressed and adjusted to an image size suitable for display, and stored in the storage device as the prepared main image before a command to execute a reproduction of the target image corresponding to the cursor position is initiated.

7. An image reproducing apparatus, comprising:

a readout device which reads out an image stored in a recording medium as a main image and a thumbnail image, wherein the main image data of the image is recorded with a predetermined number of pixels as compressed data in the recording medium, said predetermined number of pixels being determined during a photographing of said image;

a storage device which stores the image contents read out by the readout device;

a display device which displays the image contents stored in the storage device;

an instructing device through which an instruction is inputted to change an image as a display target;

a control device which reads out additional image data other than the current display target image from the recording medium to store the additional image data in the storage device as prepared main images for display before the instruction is given by the instructing device, and reads out a prepared main image corresponding to the instruction from the storage device when the instruction is given by the instructing device and immediately providing the prepared main image to the display device to display the main image corresponding to the instruction; and a size converting device, said size converting device adjusting an image size of the prepared main image corresponding to the instruction depending on a resolution of the display device; wherein image data having the image size thereof adjusted by the size converting device is stored in the storage device as the prepared main image and the compressed image data of the image is decompressed and adjusted to the image size of the prepared main image.

8. The image reproducing apparatus according to claim 7, wherein an image contained in a file to be reproduced in a reproduction mode is displayed in a single frame and a file of a frame other than the current display target image is read out from the recording medium as the prepared main image when displaying the current display target image, and the compressed image data of the file of the frame other than the current display target image is decompressed and adjusted to an image size suitable for display of the prepared main image and stored in the storage device.

9. The image reproducing apparatus according to claim 7, wherein a cursor for selecting an image to be displayed is displayed on a display screen for a multiple reproduction image and is moved by an operator of the digital camera to a cursor position, and the compressed image data of a target image corresponding to the cursor position is read out from the recording medium, decompressed and adjusted to an image size suitable for display, and stored in the storage device as the prepared main image before a command to execute a reproduction of the target image corresponding to the cursor position is initiated.

10. An image reproducing method of reading out image data stored in a recording medium as a main image and a thumbnail image, and displaying an image on a display device, comprising the steps of:

reading out additional image data other than a current display target from the recording medium to store the additional data in a storage device for display as prepared main images for display, before an instruction to change an image as a display target is inputted;

reading out a prepared main image corresponding to the instruction from the storage device and immediately providing the prepared main image to the display device to display the image corresponding to the instruction, when the instruction to change the image is inputted, wherein the main image data and the additional image data is recorded with a predetermined number of pixels as compressed data in the recording medium, said predetermined number of pixels being determined during a photographing of said optical image;

adjusting an image size of the prepared main image corresponding to the instruction with a size converting device depending on a resolution of the display device, wherein the compressed image data is decompressed and adjusted to the image size of the prepared main image; and storing the image data having the image size thereof adjusted by the size converting device in the storage device as the prepared main image.

11. The image reproducing method according to claim 10, further comprising the steps of:

providing a forward or a reverse frame reading instruction; and reading out image data of frames stored in the recording medium before being fed in accordance with the forward or the reverse frame reading instruction, wherein said prepared main image is produced with advanced readout of image data of frames.

12. The image reproducing method according to claim 10, wherein an image contained in a file to be reproduced in a reproduction mode is displayed in a single frame and a file of a frame other than the current display target image is read out from the recording medium as the prepared main image when displaying the current display target image, and the compressed image data of the file of the frame other than the current display target image is decompressed and adjusted to an image size suitable for display of the prepared main image and stored in the storage device.

13. The image reproducing method according to claim 10, wherein a cursor for selecting an image to be displayed is displayed on a display screen for a multiple reproduction image and is moved by an operator of the digital camera to a cursor position, and the compressed image data of a target image corresponding to the cursor position is read out from the recording medium, decompressed and adjusted to an image size suitable for display, and stored in the storage device as the prepared main image before a command to execute a reproduction of the target image corresponding to the cursor position is initiated.

* * * * *

UNITED STATES PATENT AND TRADEMARK OFFICE
CERTIFICATE OF CORRECTION

PATENT NO. : 6,781,629 B2
DATED : August 24, 2004
INVENTOR(S) : Yasuharu Ohnogi

It is certified that error appears in the above-identified patent and that said Letters Patent is hereby corrected as shown below:

Column 12,
Lines 4 and 5, please change "a the" to -- the --.

Signed and Sealed this

Fourth Day of January, 2005

JON W. DUDAS
*Director of the United States Patent and Trademark Office*